United States Patent
Ito

(10) Patent No.: US 8,693,028 B2
(45) Date of Patent: Apr. 8, 2014

(54) IMAGE PROCESSING APPARATUS, METHOD, AND MEDIUM STORING PROGRAM

(75) Inventor: Morikazu Ito, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 985 days.

(21) Appl. No.: 12/472,141

(22) Filed: May 26, 2009

(65) Prior Publication Data

US 2009/0310176 A1 Dec. 17, 2009

(30) Foreign Application Priority Data

Jun. 12, 2008 (JP) ................................. 2008-154592

(51) Int. Cl.
*G06F 3/12* (2006.01)
*G06F 3/00* (2006.01)

(52) U.S. Cl.
USPC ........................................ 358/1.15; 715/500

(58) Field of Classification Search
USPC ........................................ 715/500; 358/1.15
See application file for complete search history.

(56) References Cited

U.S. PATENT DOCUMENTS

| 7,391,917 B2 | 6/2008 | Ohta et al. |
| 7,535,461 B2 | 5/2009 | Ito et al. |
| 2004/0006736 A1* | 1/2004 | Kawatani ..................... 715/500 |

FOREIGN PATENT DOCUMENTS

JP          2004246577 A        9/2004

* cited by examiner

*Primary Examiner* — Firmin Backer
*Assistant Examiner* — Justin Katzwhite
(74) *Attorney, Agent, or Firm* — Fitzpatrick, Cella, Harper & Scinto

(57) ABSTRACT

An image processing apparatus compares vector data of a target document and vector data of a stored document stored in the image processing apparatus, converts each of the vector data of the target document and the vector data of the stored document into text data and extracts a difference between the text data converted from the vector data of the target document and the text data converted from the vector data of the stored document to generate and store difference data in a text format.

6 Claims, 13 Drawing Sheets

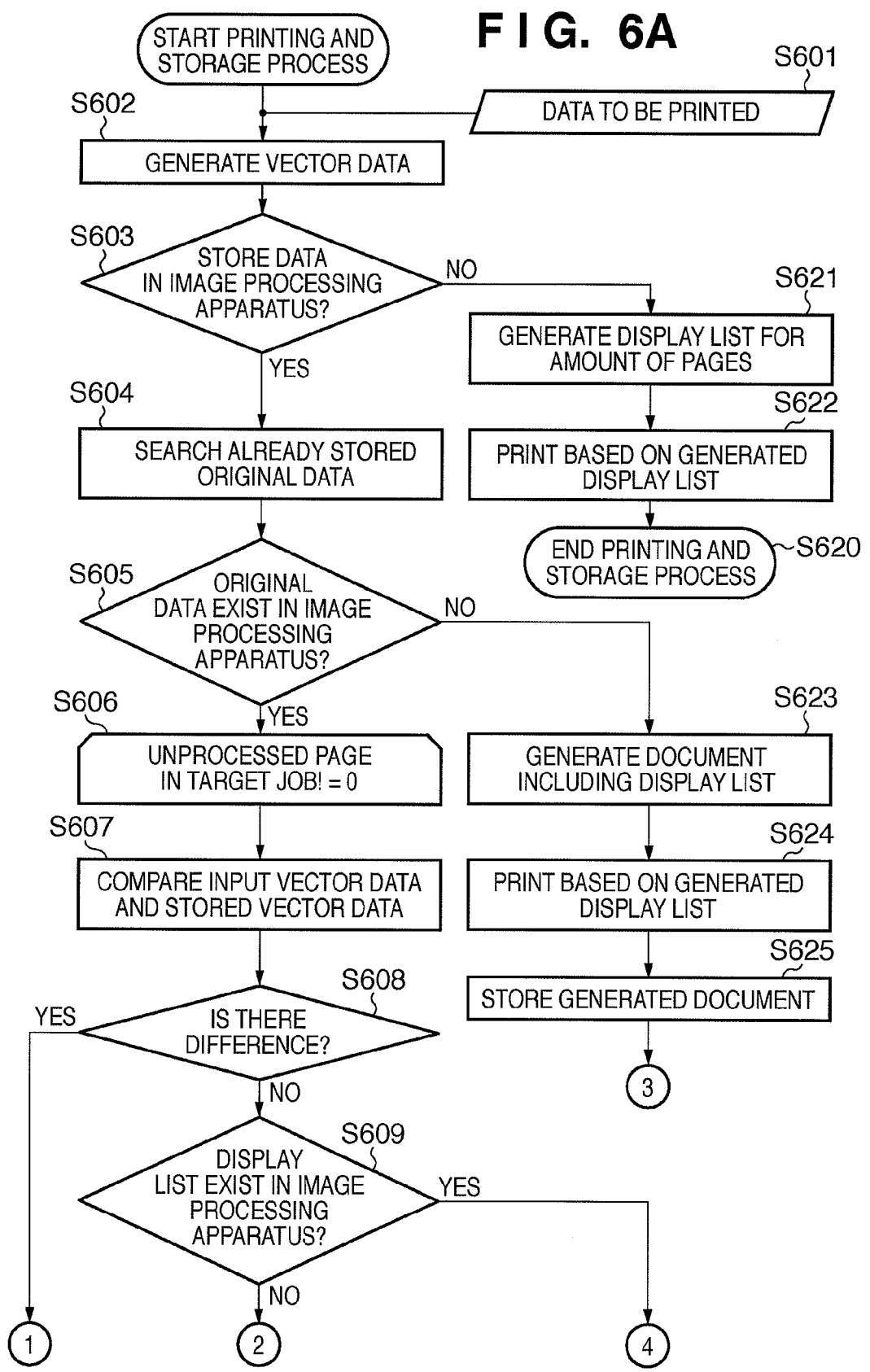

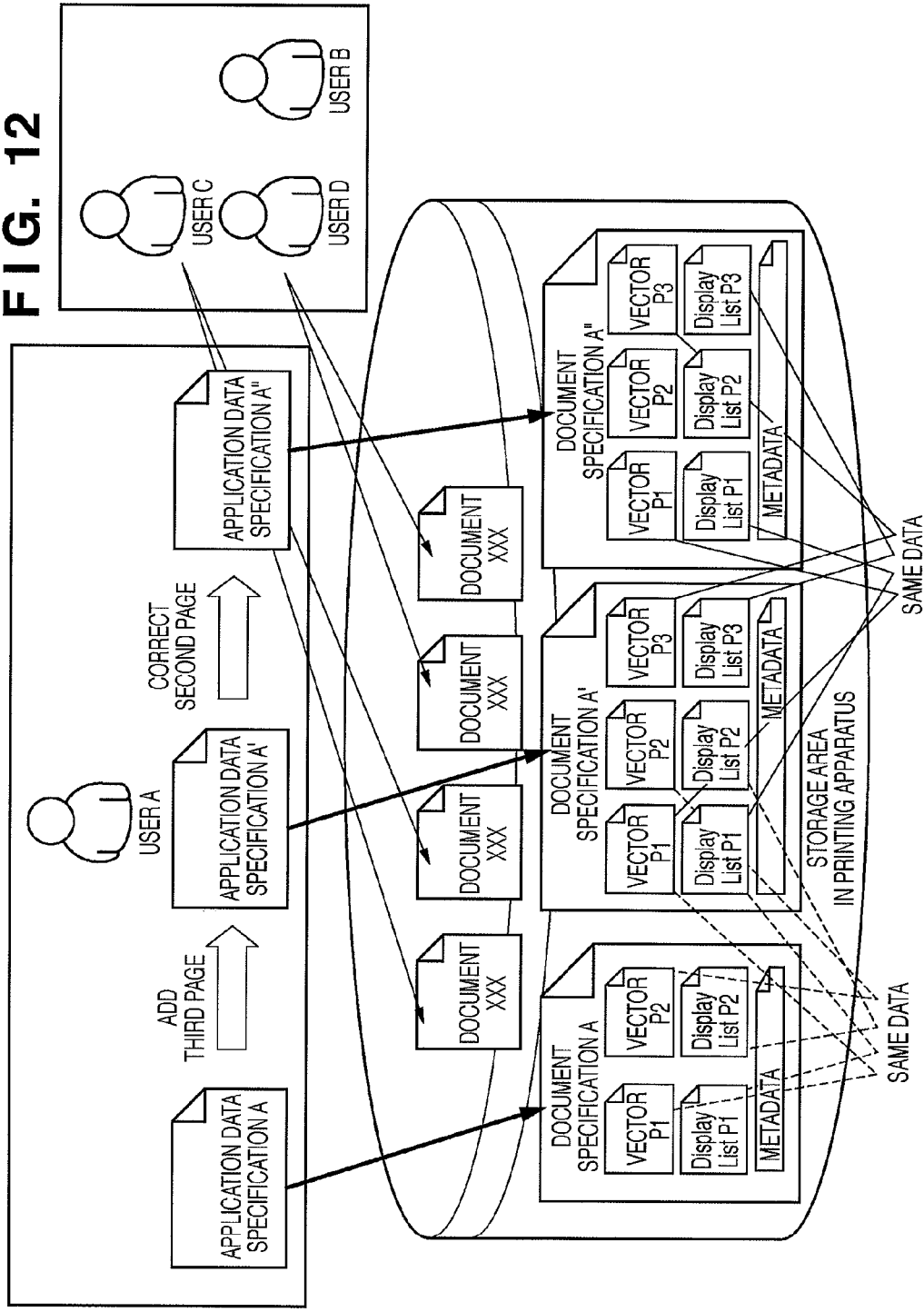

IMAGE PROCESSING APPARATUS, METHOD, AND MEDIUM STORING PROGRAM

BACKGROUND OF THE INVENTION

1. Field of the Invention

The present invention relates to an image processing apparatus, a method, and a medium storing a program for processing a document.

2. Description of the Related Art

Conventionally, a document stored in an image processing apparatus is often subjected to image processing such as editing and printing. Consider, for example, that a document "SPECIFICATION A" is stored in an image processing apparatus as shown in FIG. 12. In the example, a user A retrieves and edits the "SPECIFICATION A" and stores it again as a "SPECIFICATION A'" in the image processing apparatus. If the user A further retrieves and edits the "SPECIFICATION A'" and stores it again as a "SPECIFICATION A'''" in the image processing apparatus, then similar documents "SPECIFICATION A", "SPECIFICATION A'", and "SPECIFICATION A'''" exist in the image processing apparatus. In general, a number of users (users B to D shown in FIG. 12) may often access a certain document. In such a case, a number of documents with similar names are brought into existence if a number of users store the documents with their own names. The documents with similar names are obtained by editing the original document. Therefore, the documents redundantly include display lists and vector data used in a printing process. The redundancy of data weighs heavily on the storage capacity of a storage device (such as an HDD) in the image processing apparatus.

Meanwhile, the differences between the documents with similar names are unclear, and the convenience of the users is significantly reduced. For example, even if the rules for providing the names are integrated, the users cannot recognize which document among a number of documents should be printed if the differences between the documents are unclear. There is a CVS (Concurrent Versions System) generally known as a version management system of files. However, the display of only the difference data of the files in a form recognizable by the users is not possible even if such a function is used, and the above problem cannot be solved. Furthermore, the extraction of the differences is difficult because the vector data of the documents is binary data. As a result, the data needs to be redundantly stored.

Therefore, when a user processes a targeted document, it is desirable that the differences from other documents are clear for other users. It is also desirable that the increase in the storage capacity in the image processing apparatus can be reduced.

Various techniques are developed to compare documents and extract differences. Japanese Patent Laid-Open No. 2004-246577 describes a technique for searching original electronic data based on an input image and comparing the searched original electronic data and the inputted image to extract difference information. Furthermore, Japanese Patent Laid-Open No. 2004-246577 discloses an image processing method for converting extracted difference information into vector data and combining the vector data with original electronic data. According to the description of the image processing method, difference information not existing in the original electronic data can be reused to improve the editability. The method is advantageous in that a difference in the color value can be obtained pixel by pixel in the comparison of documents in bit map data. However, although a difference can be extracted pixel by pixel in the case of bit map data, a detailed difference of text cannot be extracted. For example, the user cannot obtain information, such as how a character string (character code) has changed, what character string is added, or how the point of thickness of line has changed.

SUMMARY OF THE INVENTION

The present invention provides an image processing apparatus that can extract a difference between documents and improve the convenience of the user.

The present invention in its first aspect provides an image processing apparatus that extracts a difference between documents, the image processing apparatus comprising: a comparing unit configured to compare vector data of a target document and vector data of a stored document stored in the image processing apparatus; and a difference data generating unit configured to convert each of the vector data of the target document and the vector data of the stored document into text data and extracts a difference between the text data converted from the vector data of the target document and the text data converted from the vector data of the stored document to generate and store difference data in a text format.

The present invention in its second aspect provides an image processing method executed in an image processing apparatus that extracts a difference between documents, the image processing method comprising: a comparing step of comparing vector data of a target document and vector data of a stored document stored in the image processing apparatus; and a difference data generating step of converting each of the vector data of the target document and the vector data of the stored document into text data and extracting a difference between the text data converted from the vector data of the target document and the text data converted from the vector data of the stored document to generate and store difference data in a text format.

The present invention in its third aspect provides a computer-readable medium storing an image processing program for extracting a difference between documents, the image processing program causing a computer to: compare vector data of a target document and vector data of a stored document stored in the image processing apparatus; and convert each of the vector data of the target document and the vector data of the stored document into text data and extract a difference between the text data converted from the vector data of the target document and the text data converted from the vector data of the stored document to generate and store difference data in a text format.

According to the present invention, a difference between documents can be extracted, and the convenience of the user can be improved.

Further features of the present invention will become apparent from the following description of exemplary embodiments with reference to the attached drawings.

BRIEF DESCRIPTION OF THE DRAWINGS

FIGS. 6A and 6B show a flow chart of a procedure of document printing and a storage process according to the present embodiment;

FIG. 12 shows that a plurality of documents is stored in the image processing apparatus.

DESCRIPTION OF THE EMBODIMENTS

Figure 1:
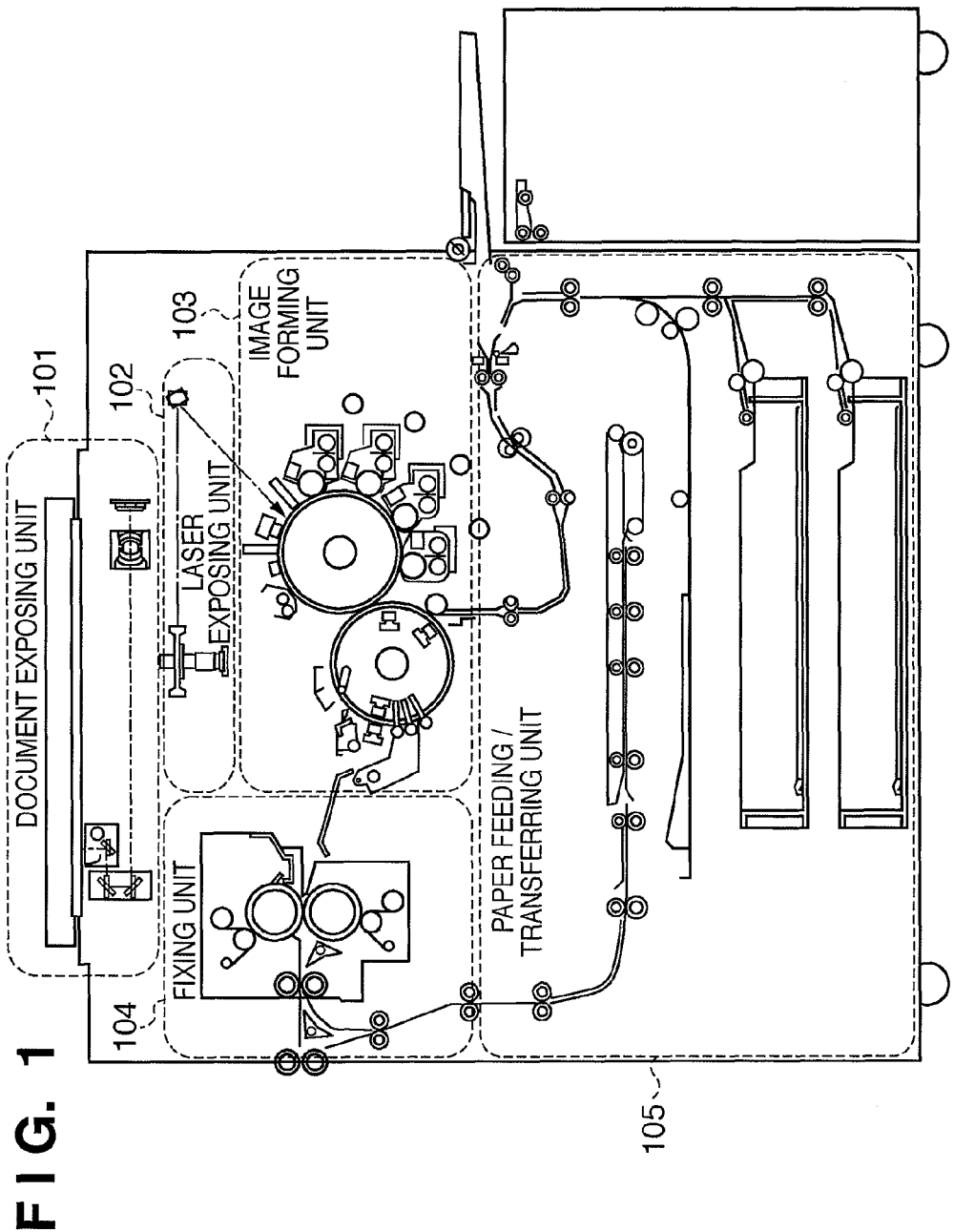
FIG. 1 shows an overall configuration of an image processing apparatus according to the present embodiment.

Preferred embodiments for carrying out the present invention will now be described in detail with reference to the drawings. The same constituent elements are designated with the same reference numerals, and the description will not be repeated.

<Configuration of Image Processing Apparatus>

FIG. 1 shows an overall configuration of an image processing apparatus according to the present embodiment. A configuration of a 1D color MFP (Multi Function Peripheral) suitable for application to the present embodiment will be described with reference to FIG. 1. The 1D color MFP includes a scanner unit (document exposing unit 101), a laser exposing unit 102, a photosensitive drum, an image forming unit 103, a fixing unit 104, a paper feeding/transferring unit 105, and a printer control unit not shown that controls the components.

The scanner unit applies light to a document placed on a platen to optically read a document image and converts the image to an electrical signal to create image data. The laser exposing unit directs a light beam such as laser light modulated according to the created image data to a polygon mirror that rotates at an equal angular velocity to illuminate the photosensitive drum as reflected scanning light.

The image forming unit rotates and drives the photosensitive drum, causes a charging unit to generate an electrostatic charge, develops a latent image formed on the photosensitive drum by the laser exposing unit using a toner, and transfers the toner image to a sheet. The micro toner not transferred and remained on the photosensitive drum is collected. The image forming unit executes the series of electrophotographic processes to form an image. Developing units (developing stations) with magenta (M), cyan (C), yellow (Y), and black (K) toners switch and sequentially repeat the electrophotographic processes, while the sheet is wound around a predetermined location of a transfer belt and rotated four times. After four rotations, the sheet transferred with a full four color toner image separates from the transfer drum and is transferred to the fixing unit.

The fixing unit is composed of a combination of rollers and belts and includes a heat source such as a halogen heater. The fixing unit melts the toner on the sheet, on which the image forming unit has transferred the toner, with heat and pressure to fix the toner. The paper feeding/transferring unit includes one or more sheet storages represented by a sheet cassette and a paper deck, separates one of the plurality of sheets stored in the sheet storages according to an instruction of a printer control unit, and transfers the sheet to the image forming unit and the fixing unit. The sheet is wound around the transfer drum of the image forming unit, rotated four times, and transferred to the fixing unit. While the sheet rotates four times, YMCK toner images are transferred to the sheet. To form images on both sides of the sheet, the sheet that has passed through the fixing unit is controlled to again pass through a transfer path for transferring the sheet to the image forming unit.

The printer control unit communicates with an MFP control unit for controlling the entire MFP to control the MFP according to an instruction and manages the states of the scanner unit, the laser exposing unit, the image forming unit, the fixing unit, and the paper feeding/transferring unit to issue an instruction for harmonious and smooth operations of the entire components.

<Configuration of Controller Unit>

Figure 2:
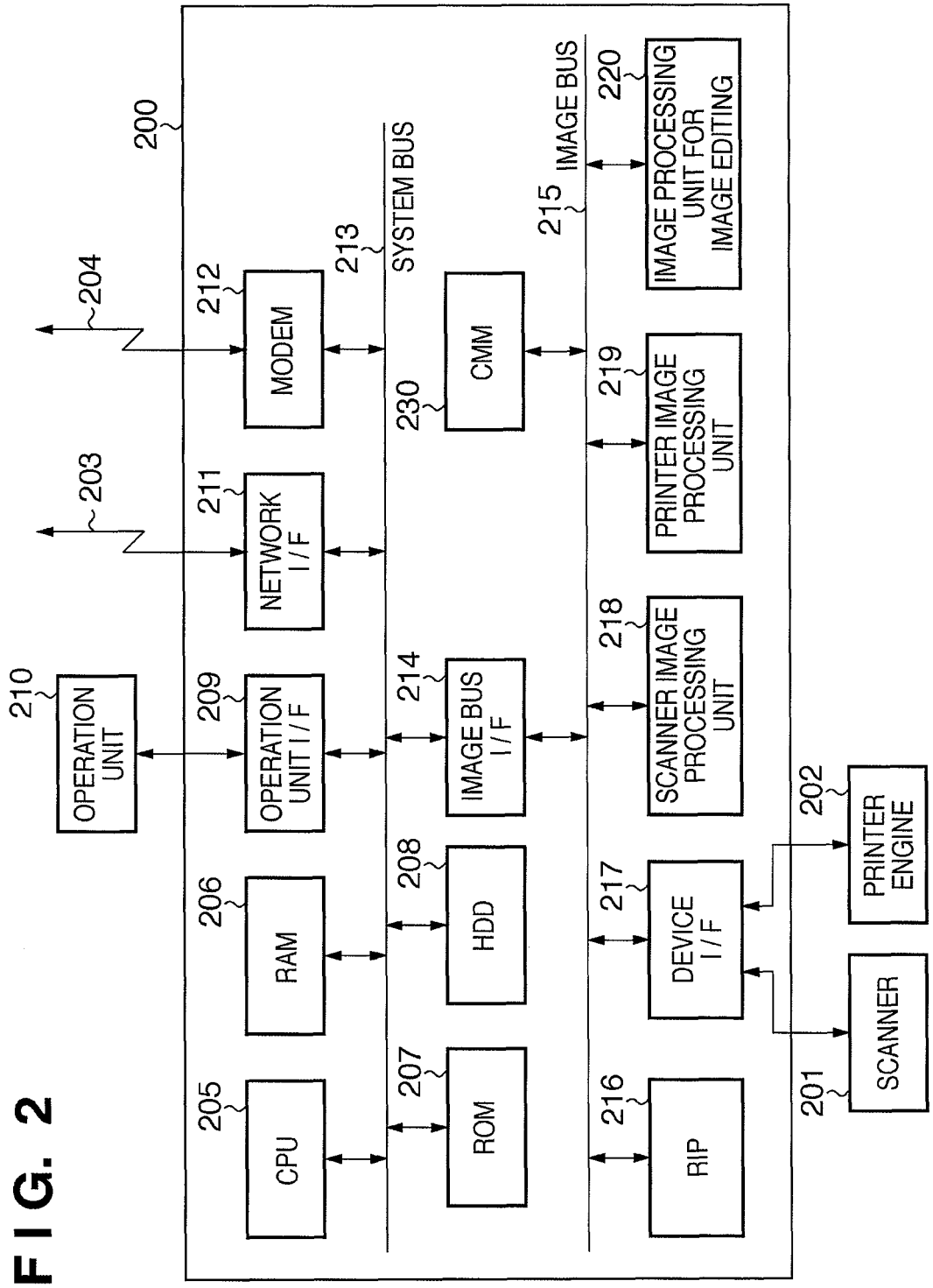
FIG. 2 is a view illustrating a block diagram of an example of a configuration of a control unit of an MFP according to the present embodiment.

FIG. 2 is a view illustrating a block diagram of an example of a configuration of a control unit (controller) of the MFP according to the present embodiment. A control unit 200 shown in FIG. 2 is connected to a scanner 201 as an image input device and a printer engine 202 as an image output device and controls reading, printing, and outputting of image data. The control unit 200 is connected to a network 203 such as a LAN and a public line 204 and can input and output image information and device information.

A CPU 205 is a central processing unit for controlling the entire MFP. A RAM 206 is a system work memory for the CPU 205 to operate and also functions as an image memory for temporarily storing the inputted image data. A ROM 207 is a boot ROM and stores a boot program of the system. An HDD 208 is a hard disk drive and stores system software for various processes, input image data, etc.

An operation unit I/F 209 is an interface for an operation unit 210 including a display screen capable of displaying image data and the like and outputs operation screen data to the operation unit 210. The operation unit I/F 209 also transmits the information inputted by the operator from the operation unit 210 to the CPU 205. A network I/F 211 is realized by, for example, a LAN card and connected to the network 203 to input and output information to and from an external apparatus. A modem 212 is connected to the public line 204 to input and output information to and from an external apparatus. The forgoing units are arranged on a system bus 213.

An image bus I/F 214 is an interface for connecting the system bus 213 and an image bus 215 for transferring the image data at high speed and functions as a bus bridge for converting the data structure. An RIP 216 as a raster image processor, a device I/F 217, a scanner image processing unit 218, a printer image processing unit 219, an image processing unit for image editing 220, and a CMM 230 as a color management module are connected on the image bus 215.

The RIP 216 translates a page description language (PDL) code and vector data described below into an image. The device I/F 217 connects the scanner 201 and the printer engine 202 with the control unit 200 and converts the synchronous system/asynchronous system of the image data. The scanner image processing unit 218 executes various processes, such as correction, modification, and editing, to the image data input from the scanner 201. The printer image processing unit 219 executes processes, such as correction and resolution conversion according to the printer engine, to the image data to be printed and outputted. The image processing unit for image editing 220 executes various image processes, such as rotation of image data and a compression/expansion process.

The CMM 230 is a dedicated hardware module for applying a color conversion process (also called color space conversion process) to the image data based on a profile and calibration data. The profile denotes information such as a function for converting color image data expressed in a device-dependent color space into a device-independent color space (for example, Lab). The calibration data denotes data for calibrating the color reproducibility of the scanner 201 and the printer engine 202 in a color complex machine.

<System Configuration>

Figure 3:
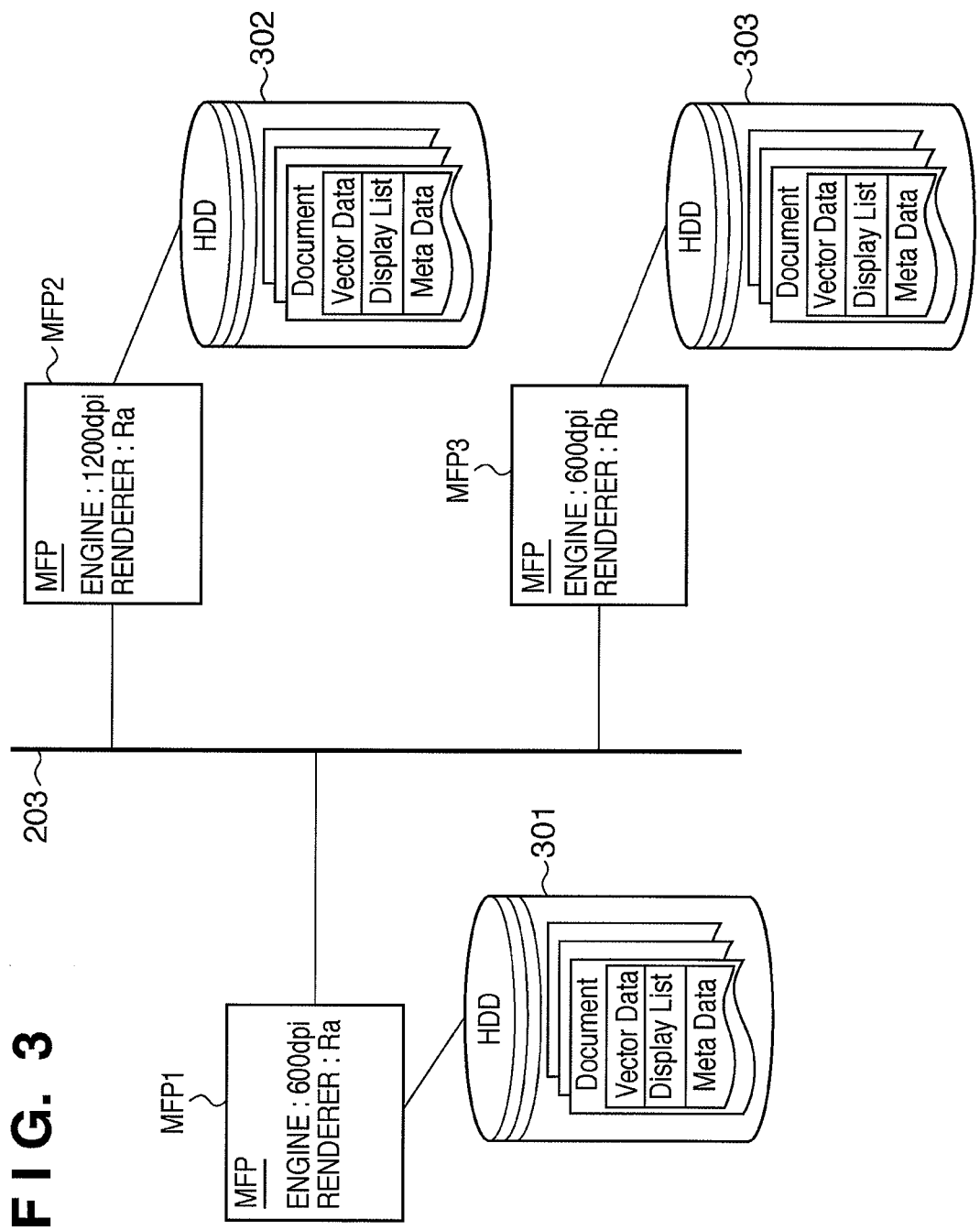
FIG. 3 is a view illustrating a block diagram of an overall configuration of an image processing system including the image processing apparatus according to the present embodiment.

FIG. 3 is a view illustrating a block diagram of an overall configuration of an image processing system including the image processing apparatus according to the present embodiment. As shown in FIG. 3, the image processing system includes an MFP1, an MFP2, and an MFP3 connected to each other through the network 203.

The MFPs include HDDs 301, 302, and 303, respectively. Printer engines (hereinafter also referred to as engines) mounted on the MFPs have different resolutions: 600 dpi for the MFP1 and the MFP3 and 1200 dpi for the MFP2. The types of renderers (rasterizers) mounted on the MFPs are also different, and the renderers of the MFP1 and the MFP2 are the same type (illustrated as "Ra"). Only the MFP3 has a different type of renderer (illustrated "Rb"). The renderer is generally composed of hardware such as ASIC. Therefore, different types of renderers cannot process different types of drawing command groups. The drawing command group is generally called a display list. The display list is an instruction that can be processed by hardware and is resolution-dependent data generated by software based on vector data with complex drawing descriptions. In general, information, such as contour of characters, drawn in a relevant page is described in the vector data.

The MFP1, the MFP2, and the MFP3 can communicate with each other using a network protocol. The arrangement of the MFP1 to 3 connected to the network 203 is not limited to the physical arrangement as shown in FIG. 3. Devices (such as a PC, various servers, and a printer) other than the MFP may be connected to the network 203.

<Controller Software Configuration>

Figure 4:
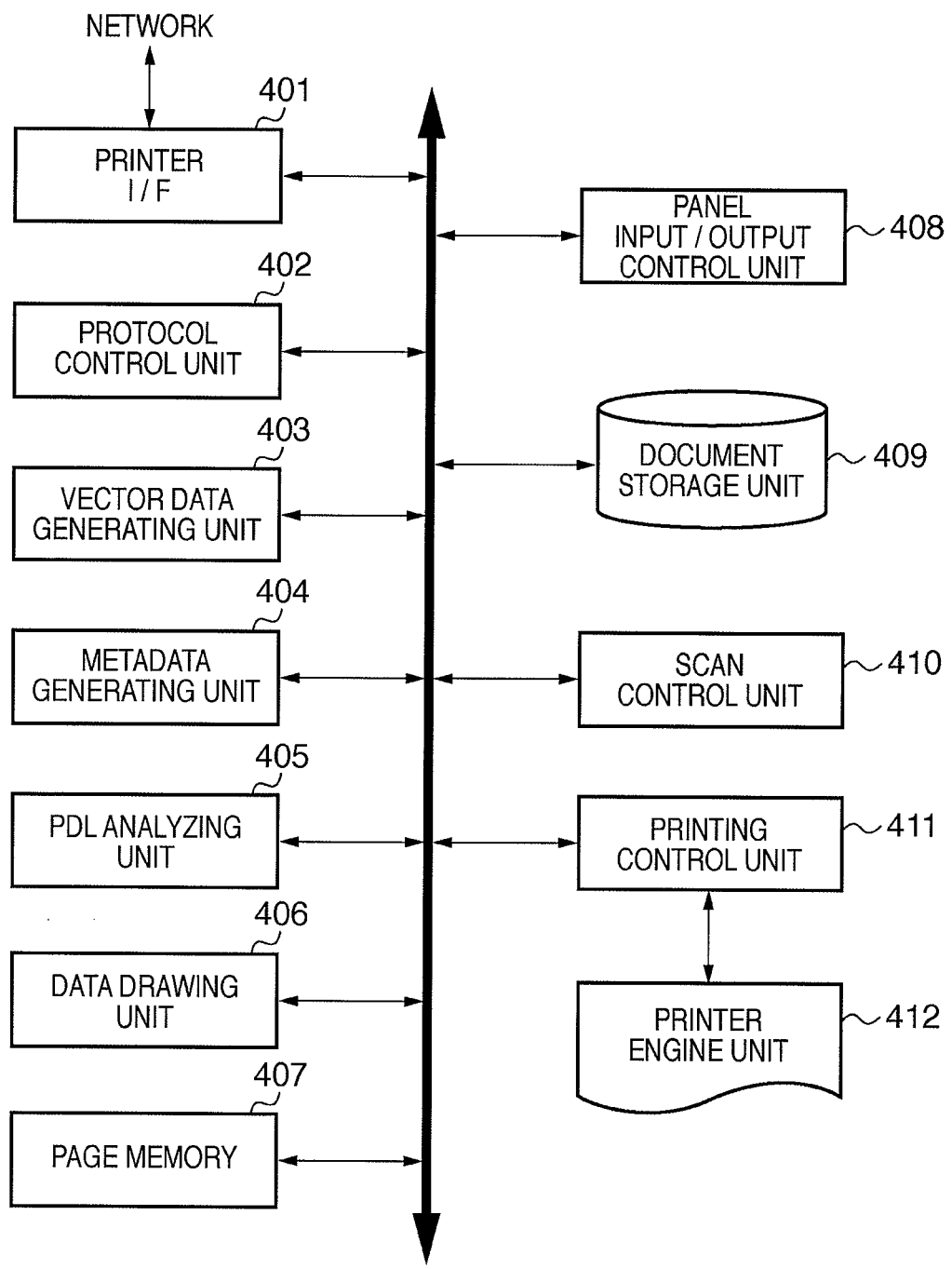
FIG. 4 is a view illustrating a block diagram of a configuration of controller software that controls an operation of the MFP.

FIG. 4 is a view illustrating a block diagram of a configuration of controller software for controlling the operation of the MFP. For example, the HDD 208 stores the controller software, and the CPU 205 brings up and executes the controller software as necessary.

A printer I/F 401 is connected to an external network and inputs and outputs data. A protocol control unit 402 analyzes a network protocol used for the communication with the outside. A vector data generating unit 403 generates (vectorizes) vector data, which is a resolution-independent drawing description, from a bit map image. A metadata generating unit 404 generates secondary information obtained in the process of vectorization as metadata. The metadata is additional data for searching and is not particularly required in the drawing process.

A PDL analyzing unit 405 analyzes PDL data and converts the PDL data into an intermediate code (display list) in a format that can be more easily processed. The intermediate code generated in the PDL analyzing unit 405 is transferred to and processed by a data drawing unit 406. The data drawing unit 406 translates the intermediate code into bit map data. The translated bit map data is sequentially drawn in a page memory 407.

The page memory 407 is a volatile memory and temporarily holds the bit map data translated by the renderer. The panel input/output control unit 408 controls the input and output from the operation panel. A document storage unit 409 is a secondary storage device composed of a hard disk and the like and stores a data file including vector data, a display list, and metadata of each job of an input document. The data file will be called a "document" in the present embodiment.

A scan control unit 410 executes various processes, such as correction, modification, and editing, to the image data input from the scanner. A printing control unit 411 converts the content of the page memory 407 into a video signal and transfers the image to a printer engine unit 412. The printer engine unit 412 is a printing mechanism that forms a permanent visible image on printing paper from the received video signal.

<Data Processing of Controller Unit>

A data flow in image processing of a document according to the present embodiment will now be described. A printing process will be described as an example of the image processing of the document.

Figure 5:
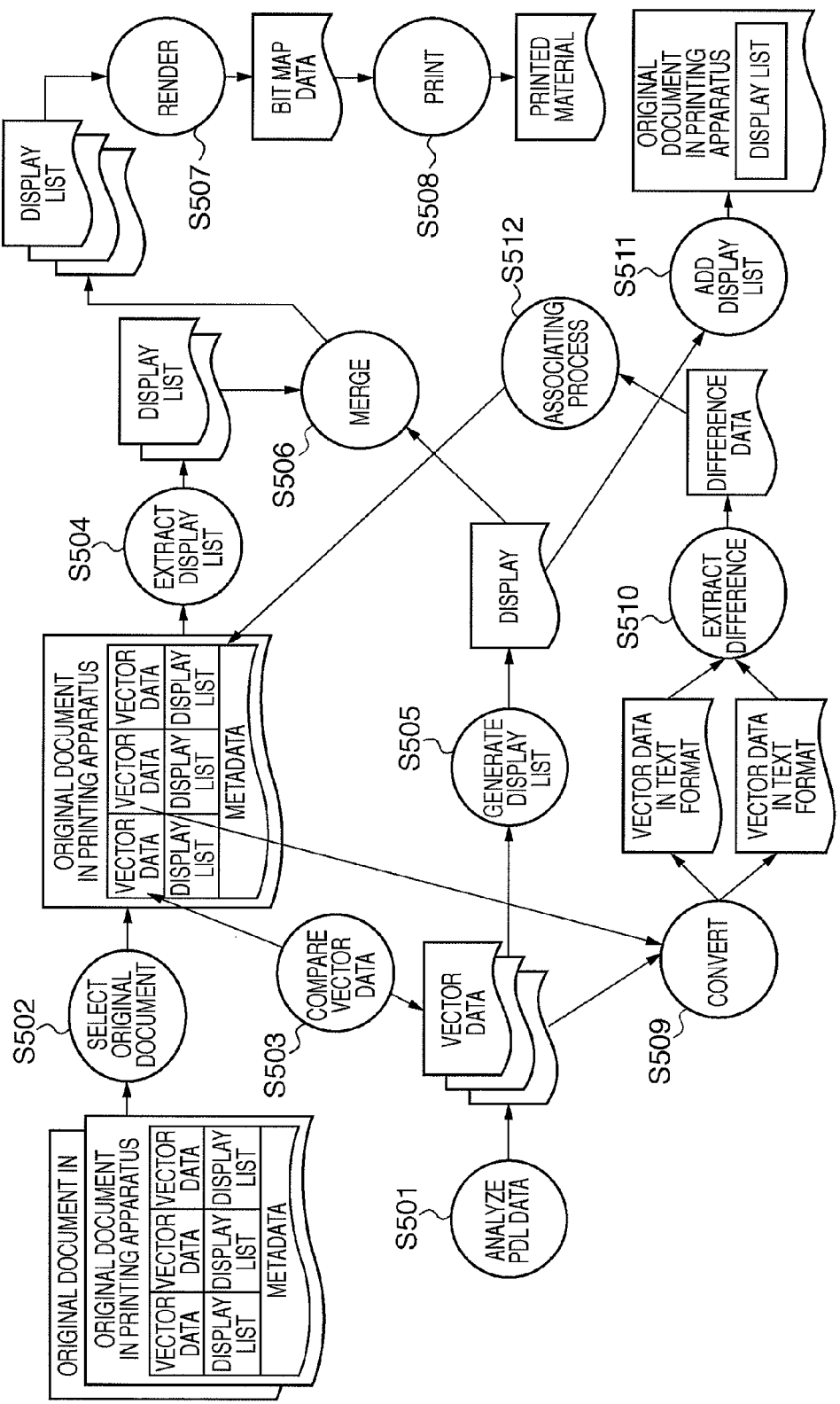
FIG. 5 shows a flow of data generated in image processing of a document according to the present embodiment.

FIG. 5 shows a flow of data generated in image processing of a document according to the present embodiment. FIG. 5 shows a data flow of printing or storing the PDL data of a document. The document herein denotes a document instructed to be printed by application software on the PC connected to the image processing apparatus through the network, and the document is written in a page description language (PDL data) by the printer driver on the PC. In the description below, the document will be referred to as a "target document". The image processing apparatus receives, prints, and outputs the target document. Such a printer operation is generally known as "PDL data printing".

In a PDL data analyzing process (step S501), the received PDL data is analyzed, and vector data is generated for the amount of the pages. FIG. 5 shows a document composed of three pages. In an original document selecting process (step S502), one original document is selected from the original documents already existing in the printing apparatus (hereinafter also called "stored documents"). The selecting process will be described below.

In a vector data comparing process (step S503), vector data in the selected original document and the vector data generated in step S501 are compared page by page. If the vector data are the same as a result of the comparison, a display list corresponding to the currently targeted vector data is extracted from the selected original document in a display list extracting process (step S504). On the other hand, if the vector data are different, a display list corresponding to the currently targeted vector data is generated from the vector data generated in step S501 in a display list generating process (step S505). Steps S504 and S505 are performed for all pages.

In a merging process (step S506), the display lists extracted or generated in steps S504 and S505 are merged. In a rendering process (step S507), the generated display lists are rendered, and bit map data is generated. In a printing process (step S508), the generated bit map data is printed.

Step S503 will be described again. If the vector data are different as a result of the comparison, the vector data are converted to a text format in a conversion process (step S509). In a difference extracting process (step S510), the generated text data are compared, and the difference is extracted to generate difference data in a text format.

In an associating process (step S512), the difference data generated in step S510 and the original document are associated. For example, in the present embodiment, link information is described in the metadata of the original document selected in the printing apparatus in step S502 so that the generated difference data is referenced.

In a document generating process (step S511), the display list generated in step S505 is added to the original document. In step S512, link information is written in the metadata of the original document selected in the printing apparatus in step S502 so that the generated display list is referenced.

As described, the received PDL data of the document is converted into vector data, and the converted vector data and the vector data of the original document in the printing apparatus are compared in the present embodiment. As a result, if the vector data are the same, the display list of the original document corresponding to the vector data is used for rendering, and the printing process is executed. If the vector data are different, the difference between the vector data is generated and stored as difference data in a text format, and link information is further written in the metadata so that the difference data can be referenced from the original document.

Figure 6B:
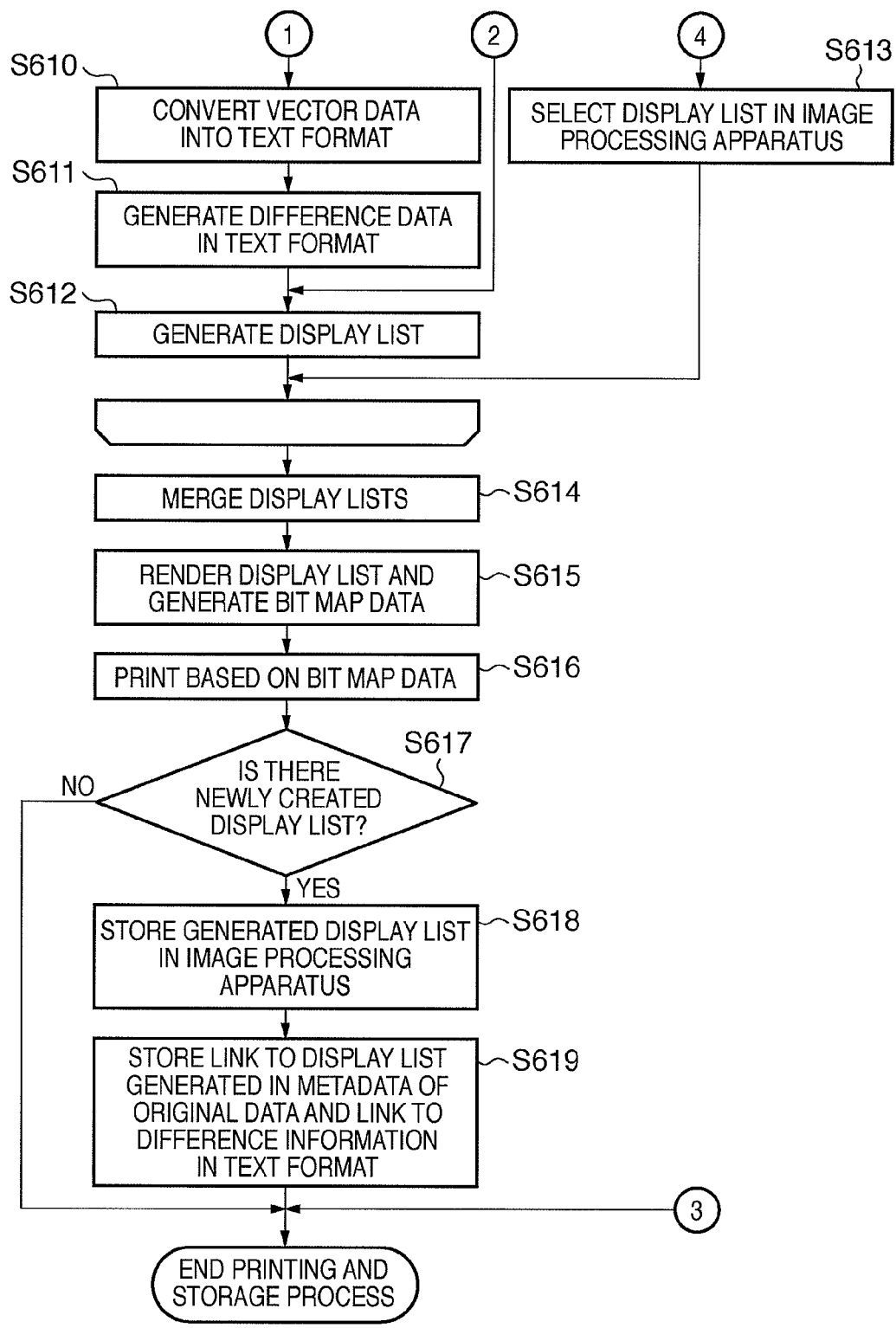

FIGS. 6A and 6B show a flow chart of a procedure of the printing process of the document in FIG. 5. FIGS. 6A and 6B show the case in which the user has designated printing and storage of the document using an application of an external PC or the like.

When the printing and storage process starts, the PDL data of the document to be printed and stored is acquired in step S601. Hereinafter, the data will be referred to as input data. In step S602, the PDL analyzing unit 405 interprets the input data to generate vector data. Next, in step S603, whether to store the input data in a storage area of a memory or the like in the image processing apparatus is determined. If the input data is determined to be stored, the original data (stored document) is searched in step S604. The determination of step S603 may be performed by determining whether the user has designated the storage after referring to the information attached to the received input data.

The most desirable method for searching the original data stored in the image processing apparatus from the input data is a method of the user, who has input the data, designating the stored data. For example, the user designates the original data when the user attempts to edit the original data stored in the image processing apparatus on the PC of the user before the procedure shown in FIGS. 6A and 6B and then process the edited document according to the procedure shown in FIGS. 6A and 6B. The fact that the search accuracy and the search speed of the original data are inferior may be tolerated, the file name of the input data and the file names stored in the image processing apparatus may be compared, and the data closest to the file name of the original data may be regarded as the original data. The character strings in the metadata included in the input data and the metadata included in the data stored in the image processing apparatus may be compared, and data with most matched keywords may be regarded as the original data. The data among the input data and the data stored in the image processing apparatus with the closest file size and the number of pages may be regarded as the original data.

As a result of the search in step S604, whether the original data exists in the image processing apparatus is determined in step S605. If the original data is determined to exist in the storage apparatus, the processes of steps S606 to S612 or S613 are repeated for all pages of the input data to be printed. In step S607, the input data and the original data are compared in the vector data in a binary format.

Figure 11:
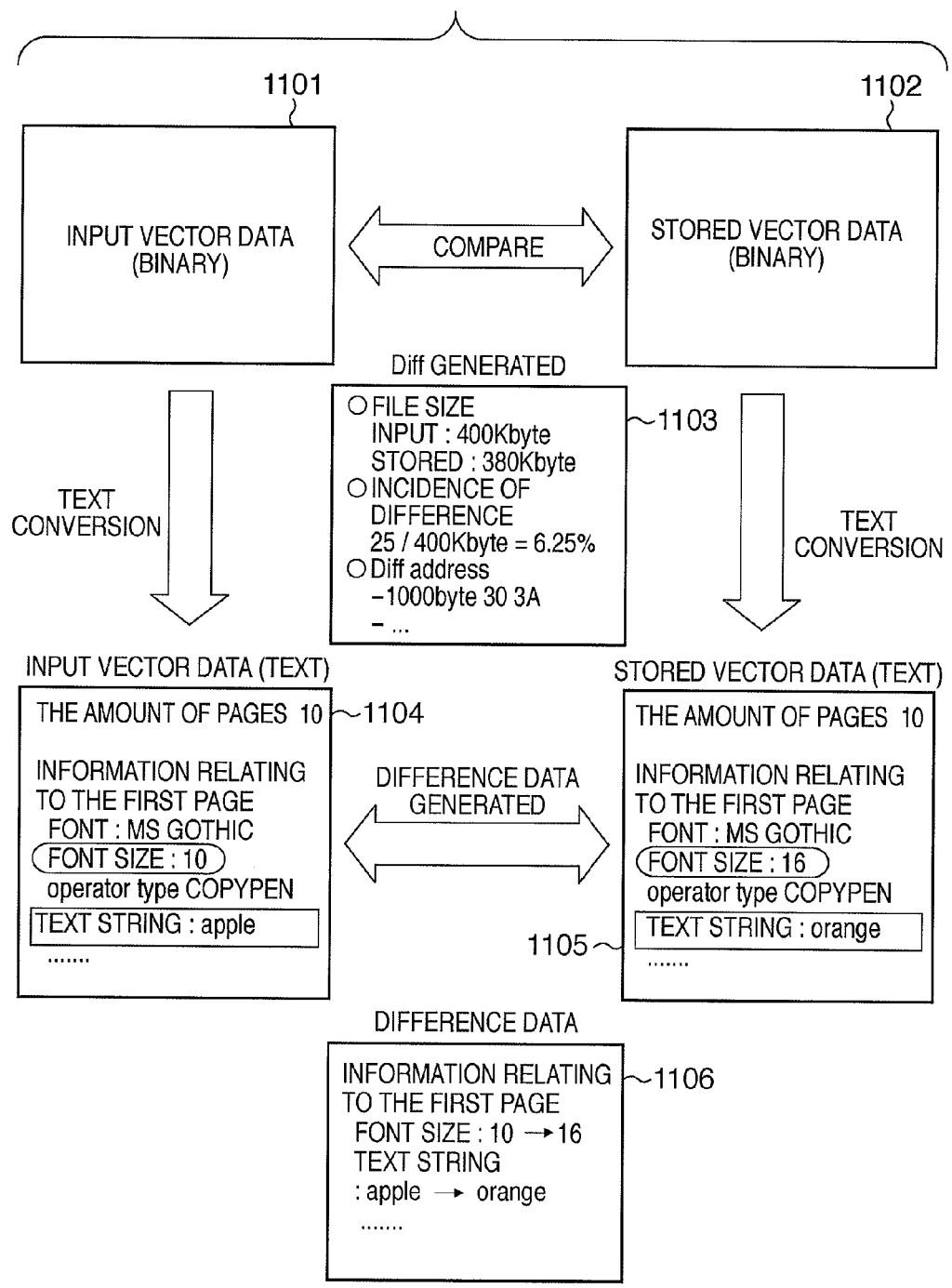
FIG. 11 shows an example of a result of a conversion process in step S607.

FIG. 11 shows an example of a result of the comparison process and conversion process in step S607 to S611. Data 1101 shown in FIG. 11 shows an example of the vector data (input vector data) generated from the input data, and data 1102 shows an example of the vector data (stored vector data) included in the original data already stored in the image processing apparatus. As shown in FIG. 11, the data 1101 and 1102 are data in a binary format indicated by 0 and 1. Because the comparison in step S607 is done using binary data, it is possible to obtain comparison result data 1103 such as whether or not the data size changed, the ratio of values that have changed (in the example of FIG. 11, 25 Kbytes of values are different from among the 400 Kbytes of input vector data), and the data address of the differing values, etc.

Whether there a difference has occurred as a result of the comparison in S607 is determined in step S608. If there is no difference, whether the original data in the image processing apparatus includes the display list is determined in step S609. On the other hand, if there is a difference, the vector data in a binary format are converted to a text format in step S610. Difference data in a text format is generated (difference data generation) in step S611, and the process proceeds to step S612.

FIG. 11 will be referenced again. Data 1103 shown in FIG. 11 is an example of data indicating the result of the comparison of binary data in step S607. The example of the data 1103 shows the sizes of the vector data to be compared, the incidence of difference, and different parts (shown with addresses). Data 1104 is text data in a text format converted from the vector data 1101 in binary form. Data 1105 is text data in a text format converted from the vector data 1102 in binary form. Information relating to the vector data is included in the data 1104 and 1105, and for example, information relating to font, font size, ROP (Raster Operation) processing, text string, etc., is included in the first page. In the example of the data 1104, "COPYPEN" indicating a command for paint fill is indicated as an OperatorType of ROP processing. Moreover, the data included in the data 1104 and 1105 is not limited to the aforementioned example, and may include other data. For example, pixel painting information relating to object edge information may be included by the description, "pixel_placement=". Moreover, although the forms of the data 1101 and the data 1104 are different (binary and text), the contents of description are the same. Similarly, although the forms of the data 1102 and the data 1105 are different, the contents of description are the same.

Data 1106 is an example of the difference data generated in step S611, only the parts different from the data 1104 and the data 1105 are illustrated. That is, because the information relating to font size and text string are different in the example of the data 1104 and 1105, in step S611, different data is generated by extracting these portions of data that are different. Although the data 1104 to 1106 are shown in an XML format, other formats may be used if the format is recognizable by the user.

As shown in FIG. 11, it is significantly difficult for the user to decode the data 1103, because the difference information is displayed in a binary format. However, it is easy for the user to decode the difference data shown in the data 1106 generated in the present embodiment, because the difference data is displayed in a text format. The difference data generated in step S611 is stored in a storage area of a memory or the like of the image processing apparatus.

If the original data in the image processing apparatus is determined to include the display list in step S609, the display list is selected in step S613. On the other hand, if the original data in the image processing apparatus is determined not to include the display list, the process proceeds to step S612.

Even if the display list is determined to be included in step S609, a user interface screen that enables the user to select whether to use the display list may be displayed, for example.

In this case, the process proceeds to step S612 if the user selects no, and a new display list is generated.

In step S612, a display list is generated based on the vector data (data 1101) determined to have a difference as a result of the comparison in step S608.

When the processes of steps S607 to S612 or S613 are executed for all pages of the input data, the process proceeds to step S614.

Other than executing the processes for all input data, the processes of steps S607 to S612 or S613 may be executed only for the pages designated by the user (for example, the user designates changed pages) in the present embodiment.

In step S614, the display lists of the pages generated or selected in steps S612 and S613 are merged, and a display list of all pages of the input data is generated. In step S615, a rendering process is executed using the display list generated in step S614 to generate bit map data, and a printing process is executed in step S616.

In step S617, whether there is a new display list generated in step S612 is determined. If the determination indicates no, the present process ends. On the other hand, if the determination indicates yes, the newly generated display list is added to the original data and stored in the image processing apparatus in step S618. Furthermore, the link information to the difference data generated in step S611 and the link information to the display list generated in step S612 are written to the metadata of the original data, and the present process ends.

Step S603 will be described again. If the input data is determined not to be stored in the image processing apparatus in step S603, a display list is generated for the amount of pages included in the input data in step S621. The generated display list is rendered and a printing process is executed in step S622, and the present process ends.

Step S605 will be described again. If the original data is determined not to exist in the image processing apparatus in step S605, a document including a display list is generated in step S623, and printing is performed based on the generated display list in step S624. In step S625, the generated document is stored in the storage apparatus, and the present process ends.

As described, the vector data of the input target document and the stored documents already stored in the image processing apparatus are compared in the present embodiment. As a result, if the vector data are different, the difference is generated and stored as difference data in a text format. Therefore, the user can manage the versions of the documents. Since the difference information is in a text format, the user can easily recognize the differences in the font size, the character string and the like, and the convenience can be improved.

In the printing process of the document edited and inputted by the user, the display list of the stored document already stored in the image processing apparatus is used, and the new display list is used only for the page corresponding to the difference data. As a result, the manpower is not required for generating the display list for the pages not corresponding to the difference data (thus, unchanged pages), so that the printing process is speeded up. There is no need to store the vector data and the display list for the pages not corresponding to the difference data, so that the file capacity for storage can be reduced.

<Document Data Structure>

Figure 7:
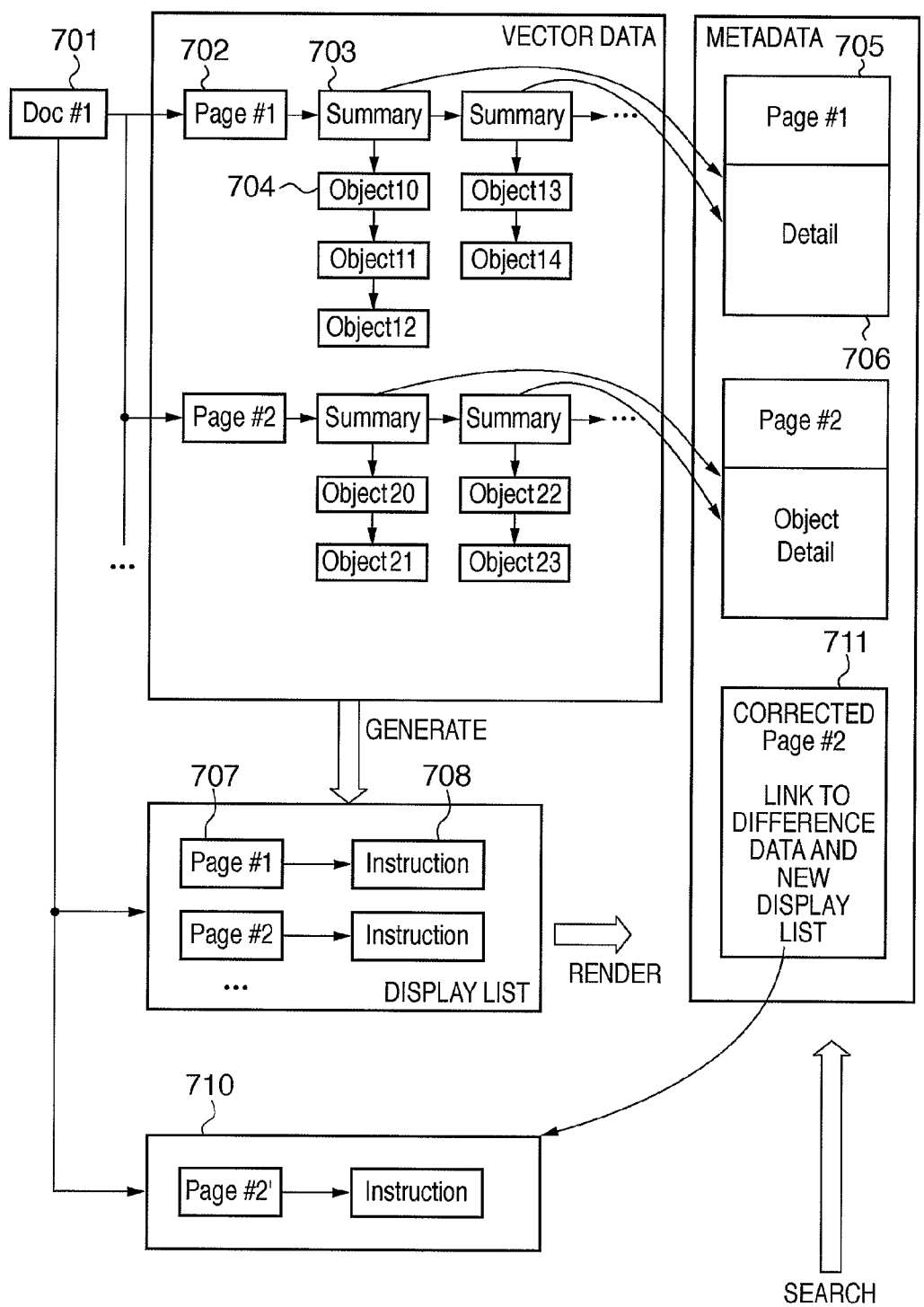
FIG. 7 shows a data structure of the document after the processes of FIGS. 5, 6A and 6B.

A configuration of the document after the processes of FIGS. 5 and 6 will now be described. FIG. 7 shows a data structure of the document after the processes of FIGS. 5 and 6 in the present embodiment. The document is data made of a plurality of pages, and as shown in FIG. 7, is roughly composed of vector data, metadata, and a display list. The document has a hierarchical structure, with a document header 701 at the top.

The vector data is composed of a page header 702, summary information 703, and objects 704, and the metadata is composed of a page header 705 and detailed information 706. The display list is composed of page headers 707 and instructions 708 for drawing and translating.

The document header 701 describes a storage location of the vector data and a storage location of the display list. Therefore, the document header 701 associates the vector data and the display list.

The vector data is resolution-independent drawing data. The page header 702 describes layout information such as size and orientation of the page. Drawing data, such as a line, a polygon, and a Bezier curve, is linked to the objects 704 one by one, and a plurality of objects are collectively associated to the summary information 703. The summary information 703 collectively expresses the features of the plurality of objects and describes information such as attribute information of divided areas.

The metadata is additional information for the search unrelated to the drawing process. The page header 705 describes information related to the pages, such as whether the metadata is generated from bit map data or from PDL data. The detailed information 706 describes character strings (character code strings) generated as OCR information or image information. The detailed information 706 of the metadata can be referenced from the summary information 703 of the vector data.

The display list is an intermediate code used in the bit map translation by the renderer. The page header 707 describes a management table of drawing information in the pages (instructions 708) and the like, and the instructions 708 are composed of resolution-dependent drawing information.

As described with reference to FIGS. 5 and 6, if the vector data acquired from the inputted document and the vector data of the stored document are different, a newly generated display list 710 is added to the stored document. Data 711 describing link information to the difference data stored separately from the stored documents and to the newly generated display list 710 is further added to the metadata.

Figure 8A:
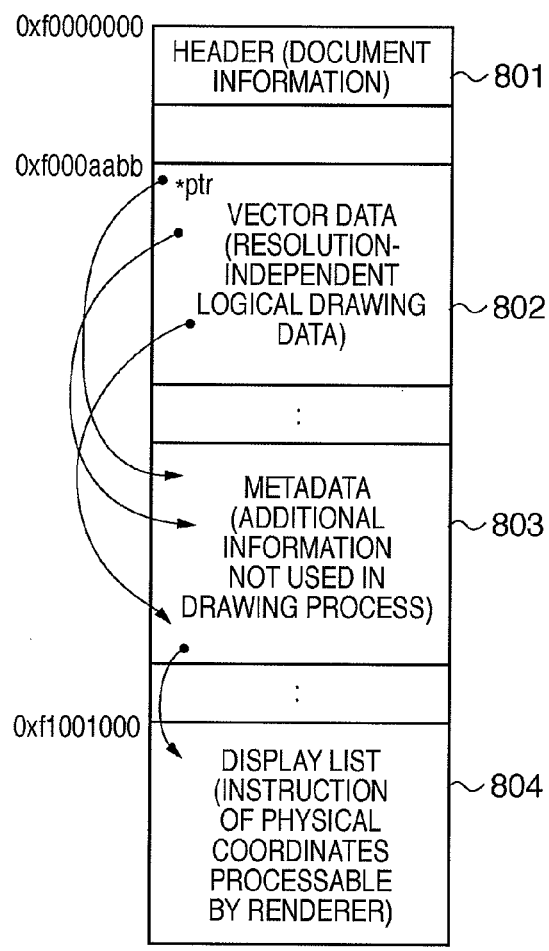
FIG. 8A shows an example of an arrangement on a memory with the data structure shown in FIG. 7.
Figure 8B:
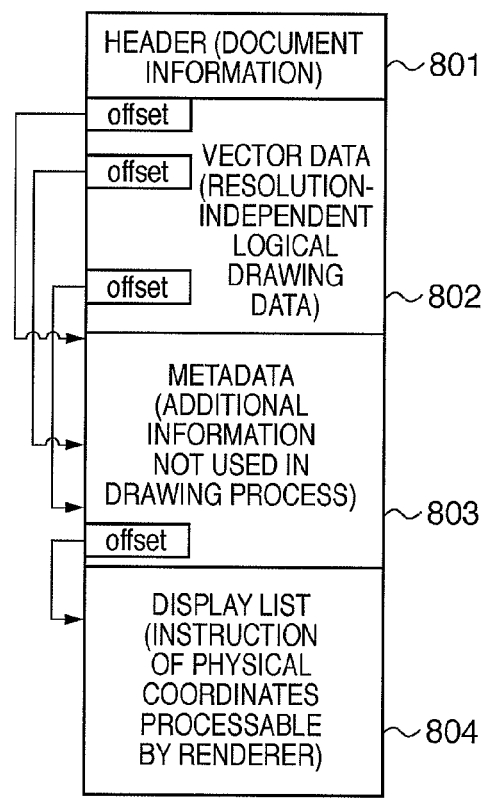
FIG. 8B shows an example of a file configuration.

FIGS. 8A and 8B show an example of an arrangement on a memory with the data structure shown in FIG. 7 and an example of a file configuration. As shown in FIG. 8A, a header area 801 is arranged at the top of a memory area in the present document, and a vector data area 802, a metadata area 803, and a display list area 804 are arranged at arbitrary addresses on the memory. As shown in FIG. 8A, a reference from the vector data to the metadata and a reference from the metadata to a newly generated display list are made by pointers.

As shown in FIG. 8B, the header area 801, the vector data area 802, the metadata area 803, and the display list area 804 are serialized to form a file in the present embodiment. As shown in FIG. 8B, a reference from the vector data to the metadata and a reference from the metadata to the newly generated display list are made by the offset.

<Data Processing of Controller Unit>

Figure 9:
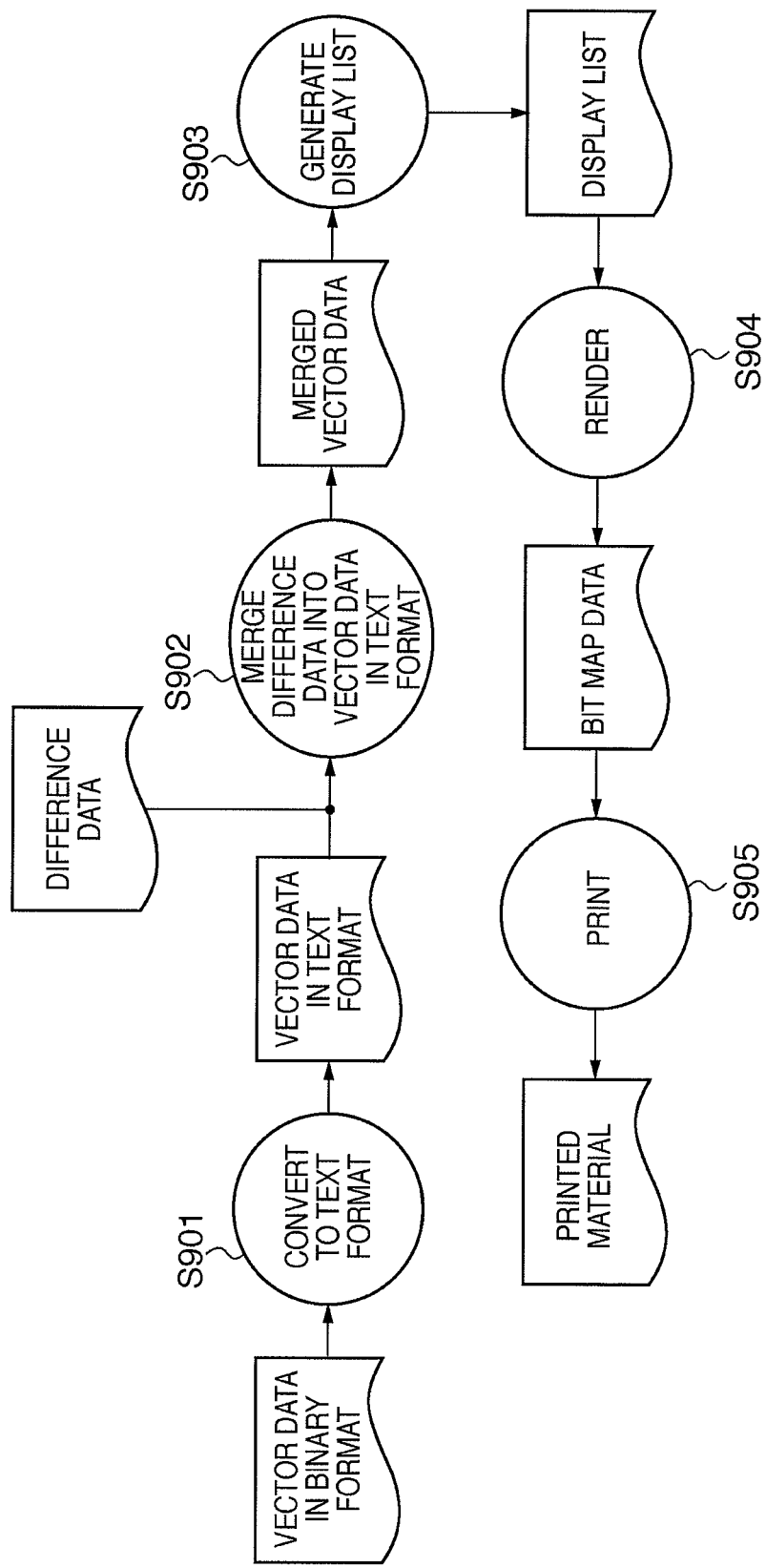
FIG. 9 shows a data flow of restoring and printing a past version.

FIG. 9 shows a data flow of restoring and printing a past version. Assuming that the user refers to the difference data to execute a printing process of a desired version, the user can search data with the difference data as a search condition and determine a desired version for printing. In a conversion process (step S901), the vector data of the document including the difference data is converted to a text format. In a merging process (step S902), the vector data converted to a text format and the difference data are merged, and vector data after merging is generated.

In a display list generating process (step S903), a display list is generated. In a rendering process (step S904), the display list is rendered, and a bit map is generated. Lastly, in a printing process (step S905), a printed material is generated.

Figure 10:
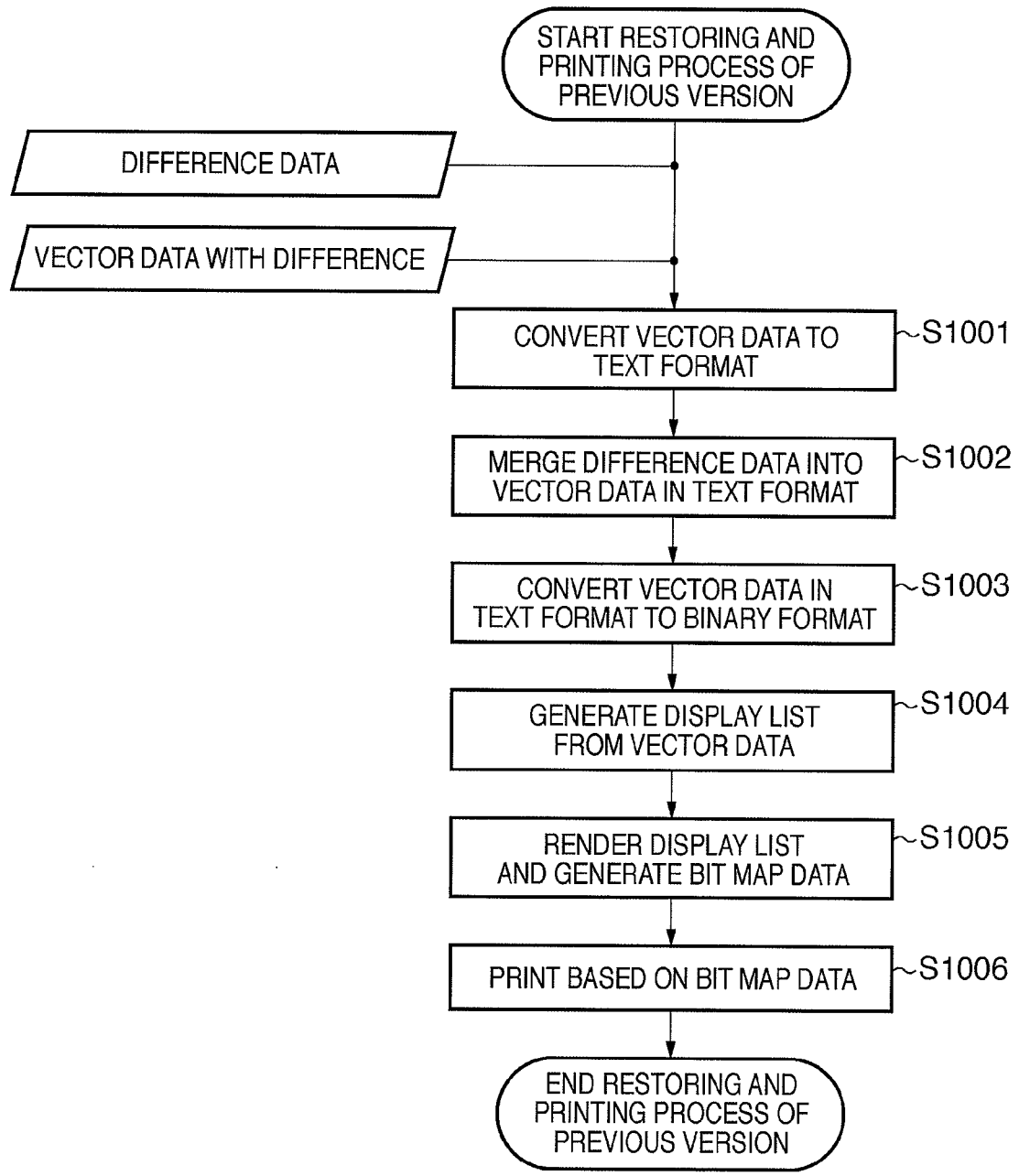
FIG. 10 is a flow chart of a procedure of a process of restoring and printing the past version.

FIG. 10 is a flow chart of a procedure of a process of restoring and printing the past version. For example, the user refers to the difference data on an application of an external PC to start the restoring and printing process of the previous version. In step S1001, the difference data indicating the difference from the original data and the vector data of the document including the difference data are inputted, and the vector data is converted to a text format. In step S1002, the vector data in a text format and the difference data are merged in a text format.

In step S1003, the merged vector data in a text format is again converted to a binary format. In step S1004, the vector data in a binary format is converted to a display list. In step S1005, the display list is rendered, and bit map data is generated. Lastly, in step S1006, the generated bit map data is used, and a printing process is executed.

The link information to the difference data is written to the metadata when the restoring process described above is executed. Therefore, the user can search the data, with the information of the difference data as a condition.

The present invention may be applied to a system composed of a plurality of devices or may be applied to an apparatus composed of one device. Examples of the system and the apparatus include a scanner, a printer, a PC, a copy machine, a complex machine, and a facsimile apparatus. The present invention can also be attained by directly or remotely supplying a software program for realizing the functions of the embodiments to the system or the apparatus and a computer included in the system or the like reading and executing the supplied program code.

Therefore, since the computer realizes the functions and the processes of the present invention, the program code installed in the computer also realizes the present invention. Thus, the computer program for realizing the functions and the processes is one of the present inventions. In that case, the program can have any form, such as an object code, a program executed by an interpreter, or script data supplied to an OS, as long as the functions of the program are included.

Examples of a recording medium for supplying the program include a flexible disk, a hard disk, an optical disk, a magneto-optical disk, an MO, a CD-ROM, a CD-R, and a CD-RW. The examples of the recording medium also include a magnetic tape, a non-volatile memory card, a ROM, and a DVD (DVD-ROM and DVD-R).

A browser of a client computer may be used to download the program from a website on the Internet/intranet. More specifically, the computer program of the present invention or a compressed file including an automatic install function may be downloaded from the website to a recording medium such as a hard disk.

The present embodiments can also be realized by dividing the program code constituting the program of the present invention into a plurality of files and downloading the files from different websites. Thus, the WWW servers for a plurality of users to download the program files for realizing the functions and processes of the present invention by the computer may be constituent elements of the present invention.

The program of the present invention may be encrypted and stored in a recording medium such as a CD-ROM and distributed to the users. In that case, for example, only the users who have met predetermined conditions are allowed to download key information for removing the encryption from a website through the Internet/intranet. The program encrypted by the key information is decoded and executed, and the program is installed on a computer.

The computer may execute a read program (image processing program) to realize the functions of the embodiments. An OS or the like operating on the computer may execute part or all of the actual processes based on an instruction of the program. The functions of the embodiments can also be realized in that case. Furthermore, a program read from a recording medium may be written into a memory included in a function expansion board inserted into a computer or in a function expansion unit connected to the computer. A CPU or the like included in the function expansion board or the function expansion unit may execute part or all of the actual processes based on an instruction of the program. In this way, the functions of the embodiments can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-154592, filed Jun. 12, 2008, which is hereby incorporated by reference herein in its entirety.

What is claimed is:

1. An image processing apparatus that extracts a difference between documents, the image processing apparatus comprising:
   a comparing unit configured to compare vector data of a target document with vector data of a stored document stored in the image processing apparatus to determine whether there is a first difference between the vector data of the target document and the vector data of the stored document, wherein both of the vector data of the target document and the vector data of the stored document are resolution-independent drawing data in binary format;
   a converting unit configured to, when said comparing unit determines that there is the first difference between the vector data of the target document and the vector data of the stored document, convert the vector data of the target document into first text data and convert the vector data of the stored document into second text data;
   a difference data generating unit configured to compare first text data converted from the vector data of the target document with the second text data converted from the vector data of the stored document to generate second difference data in a text format between the first text data and the second text data; and
   a linking unit configured to link the second difference data generated by the difference data generating unit with the stored document.

2. The image processing apparatus according to claim 1, further comprising:
   a display list generating unit configured to generate a display list based on the vector data of the target document when said comparing unit determines that there is the first difference between the vector data of the target document and the vector data of the stored document, wherein the display list is resolution-dependent; and
   an adding unit configured to add the display list to the stored document,
   wherein printing is performed using the display list generated by the display list generating unit.

3. The image processing apparatus according to claim 1, further comprising:

a combining unit configured to combine the second text data corresponding to the vector data of the stored document with the second difference data to generate combined data, wherein the combined data is converted into vector data, and printing is performed using a display list generated based on the converted vector data.

4. The image processing apparatus according to claim 1, wherein the vector data is generated based on a page description language describing a document.

5. An image processing method executed in an image processing apparatus that extracts a difference between documents, the image processing method comprising:

a comparing step of comparing vector data of a target document with vector data of a stored document stored in the image processing apparatus to determine whether there is a first difference between the vector data of the target document and the vector data of the stored document, wherein both of the vector data of the target document and the vector data of the stored document are resolution-independent drawing data in binary format;

a converting step of, when said comparing step determines that there is the first difference between the vector data of the target document and the vector data of the stored document, converting the vector data of the target document into first text data and converting the vector data of the stored document into second text data;

a difference data generating step of comparing the first text data converted from the vector data of the target document with the second text data converted from the vector data of the stored document to generate second difference data in a text format between the first text data and the second text data; and a linking step of linking the second difference data generated by the difference data generating step with the stored document.

6. A non-transitory computer-readable medium storing an image processing program for extracting a difference between documents, the image processing program causing a computer to:

compare vector data of a target document with vector data of a stored document stored in the image processing apparatus to determine whether there is a first difference between the vector data of the target document and the vector data of the stored document, wherein both of the vector data of the target document and the vector data of the stored document are resolution-independent drawing data in binary format;

convert, when said comparing determines that there is the first difference between the vector data of the target document and the vector data of the stored document the vector data of the target document into first text data and convert the vector data of the stored document into second text data;

comparing the first text data converted from the vector data of the target document with the second text data converted from the vector data of the stored document to generate second difference data in a text format between the first text data and the second text data; and link the generated second difference data with the stored document.

\* \* \* \* \*